(12) United States Patent
Muske

(10) Patent No.: US 10,019,520 B1
(45) Date of Patent: Jul. 10, 2018

(54) SYSTEM AND PROCESS FOR USING ARTIFICIAL INTELLIGENCE TO PROVIDE CONTEXT-RELEVANT SEARCH ENGINE RESULTS

(71) Applicant: Joy Sargis Muske, Temecula, CA (US)

(72) Inventor: Joy Sargis Muske, Temecula, CA (US)

( * ) Notice: Subject to any disclaimer, the term of this patent is extended or adjusted under 35 U.S.C. 154(b) by 820 days.

(21) Appl. No.: 14/331,643

(22) Filed: Jul. 15, 2014

Related U.S. Application Data

(60) Provisional application No. 61/915,792, filed on Dec. 13, 2013.

(51) Int. Cl.
*G06F 17/30* (2006.01)
*G06N 5/04* (2006.01)

(52) U.S. Cl.
CPC .... *G06F 17/30864* (2013.01); *G06F 17/3053* (2013.01); *G06F 17/3069* (2013.01); *G06F 17/30604* (2013.01); *G06F 17/30607* (2013.01); *G06N 5/043* (2013.01)

(58) Field of Classification Search
None
See application file for complete search history.

(56) References Cited

U.S. PATENT DOCUMENTS

| | | | | |
|---|---|---|---|---|
| 5,659,732 A | * | 8/1997 | Kirsch | G06F 17/30864 |
| 5,812,134 A | * | 9/1998 | Pooser | G06F 3/04815 |
| | | | | 707/999.102 |
| 5,924,090 A | * | 7/1999 | Krellenstein | G06F 17/30696 |
| 6,654,742 B1 | * | 11/2003 | Kobayashi | G06F 17/3061 |
| | | | | 707/7 |
| 7,181,438 B1 | * | 2/2007 | Szabo | G06F 17/30522 |
| 7,502,786 B2 | * | 3/2009 | Liu | G06F 17/30864 |
| | | | | 707/5 |
| 7,827,125 B1 | * | 11/2010 | Rennison | G06F 17/3066 |
| | | | | 706/14 |
| 7,860,852 B2 | * | 12/2010 | Brunner | G06F 17/30864 |
| | | | | 707/706 |
| 7,966,225 B2 | * | 6/2011 | Chan | G06F 17/30522 |
| | | | | 705/26.7 |
| 8,463,815 B1 | * | 6/2013 | Zoellner | G06F 17/3012 |
| | | | | 707/694 |

(Continued)

OTHER PUBLICATIONS

Akiba et al, Shortest-Path Queries for Complex Networks: Exploiting Low Tree-width Outside the Core, Mar. 26-30, 2012, ACM, pp. 144-155 (Year: 2012).*

(Continued)

*Primary Examiner* — James Trujillo
*Assistant Examiner* — Cheryl M Shechtman
(74) *Attorney, Agent, or Firm* — Plager Schack LLP

(57) ABSTRACT

A system and a process for using artificial intelligence (AI) to provide context-relevant search engine results are disclosed. The system of some embodiments is an object-oriented relational-contextual analysis (OORCA) system. The OORCA system reverses the search process performed by typical search engines by having experts assess a topic prior to the search and then performing searches based on expert input. The OORCA system utilizes AI and expert system techniques to simulate common sense reasoning in relation to search criteria based on human expert analysis of digital objects.

10 Claims, 5 Drawing Sheets

(56) References Cited

U.S. PATENT DOCUMENTS

| | | | | |
|---|---|---|---|---|
| 8,566,273 | B2* | 10/2013 | Moore | G06F 17/30533 704/9 |
| 8,615,517 | B1* | 12/2013 | Vice | G06F 17/30017 707/621 |
| 2006/0047421 | A1* | 3/2006 | Goldberg | G01C 21/34 701/533 |
| 2006/0117267 | A1* | 6/2006 | Koralski | G06F 9/4443 715/767 |
| 2008/0291925 | A1* | 11/2008 | Fisher | H04L 45/00 370/400 |

OTHER PUBLICATIONS

Goldberg et al, Computing the Shortest Path: A* Search Meets Graph Theory, Jul. 2004, Microsoft Research, pp. 1-26 (Year: 2004).*

Antsfeld, Leonid, Shortest Paths in Networks, Association for the Advancement of Artificial Intelligence (AAAI), 2013, pp. 1-7 (Year: 2013).*

* cited by examiner

SYSTEM AND PROCESS FOR USING ARTIFICIAL INTELLIGENCE TO PROVIDE CONTEXT-RELEVANT SEARCH ENGINE RESULTS

CLAIM OF BENEFIT TO PRIOR APPLICATION

This application claims benefit to U.S. Provisional Patent Application 61/915,795, entitled "USE OF ARTIFICIAL INTELLIGENCE IN PROVIDING SEARCH ENGINE RESULTS," filed Dec. 13, 2013. The U.S. Provisional Patent Application 61/915,795 is incorporated herein by reference.

BACKGROUND

Embodiments of the invention described in this specification relate generally to machines and processes that organize, obtain and filter data.

Prior to embodiments of the disclosed invention, popular search engines commonly over retrieved and under retrieved data, producing massive incorrect results and missing correct results because they do not understand the meaning of the user's query.

Google and other keyword search engines use spiders, an index of keywords with URL location and an algorithm called PageRank to return search results based on a user's input of keywords and/or phrases. Factors which increase the page rank are multiple appearances of the keywords on a web page, web pages which have been around for a long time, popularity of a web page and a large number of web pages that link to the web page. Web pages with the highest PageRank web page appear at the top of the Google search results listing. A person may never find the information they are looking for, or get an overload of incorrect results because the context of the keyword is not specified and the choice of multiple key words may not be associated with anything relevant. Results are stored, tracked, and acted on with no method in place to correct for errors. The key word search system assumes repeated search queries will drive the return of correct results. Query results are then associated with subsequent searches. Future users will be hardwired to receive the same results because the search was popular, but the results can still be irrelevant. Compounding the problem, search engines collect user location and demographics to skew results and fold in advertisements tailored to the data collected about the user. In effect, as search engine are used repeatedly, the functionality shifts to producing personalized advertising rather than providing context relevant information.

Therefore, what is needed is a way to provide information in relation to a search performed with a search engine, where the information is provided in context with a domain for the intended search according to an expert in the domain.

BRIEF DESCRIPTION

Embodiments of the invention include a novel object-oriented relational-contextual analysis (OORCA) system and a novel process for providing search engine results. In some embodiments, the process organizes a set of digital objects into an object-oriented tree and determines distances between nodes of the tree according to a weight matrix defined by a domain expert. In some embodiments, the OORCA system performs the process for providing search engine results. In some embodiments, the OORCA system includes an artificial intelligence engine to provide context relevant search results.

In some embodiments, the process for providing search engine results includes (i) organizing a set of digital objects into a tree structure, (ii) determining distances between nodes of the digital objects organized in the tree structure, (iii) comparing different types of searches in a menu of searches, (iv) receiving a menu selection of a particular search type, and (v) providing both the menu of different types of searches and the particular search type to a domain expert.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
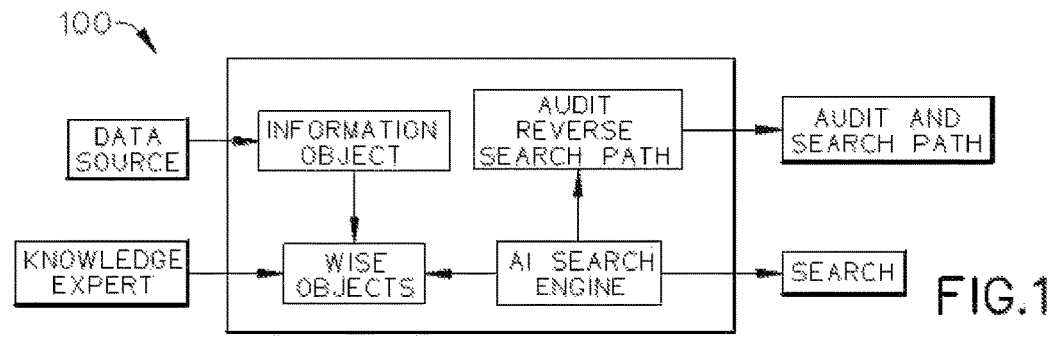
FIG. 1 conceptually illustrates a high-level architecture of an object-oriented relational-contextual analysis (OORCA) system in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments include an object-oriented relational-contextual analysis (OORCA) system and a process for providing search engine results. In some embodiments, the process organizes a set of digital objects into an object-oriented tree and determines distances between nodes of the tree according to a weight matrix defined by a domain expert. In some embodiments, the OORCA system performs the process for providing search engine results. In some embodiments, the OORCA system includes an artificial intelligence engine to provide context relevant search results.

In some embodiments, the process for providing search engine results includes (i) organizing a set of digital objects into a tree structure, (ii) determining distances between nodes of the digital objects organized in the tree structure, (iii) comparing different types of searches in a menu of searches, (iv) receiving a menu selection of a particular search type, and (v) providing both the menu of different types of searches and the particular search type to a domain expert.

In some embodiments, the process organizes the set of digital objects into an object-oriented tree. A digital object can be a root of the object-oriented tree; wherein nodes serve as children of the root are connected to the root, directly and indirectly, with branches. In some embodiments, the process determines distances between the nodes. In some embodiments, the distances between nodes are defined by a weight matrix. The weight matrix includes weighted multiple value variables calculated by algorithms based on conditions. In some embodiments, the weight matrix includes a combination of variables, weights, conditions, and decision algorithms defined by a domain expert.

In some embodiments, the process arranges the nodes of the object-oriented tree based on the determined distances. A discrete distance separates a node arranged in the object-oriented tree from each other node in the object-oriented tree. In some embodiments, the process performs a set of artificial intelligence operations to compare the different types of searches in the menu of searches. In some embodiments, a sub-process artificial intelligence engine performs the set of artificial intelligence operations. In some embodiments, the menu selection of the particular search type is a user selection made by a human user. In some embodiments, the domain expert revises the weight matrix based on the selection.

Several more detailed embodiments are described below. Section I describes an object-oriented relational-contextual analysis (OORCA) system and a process performed by the OORCA system for providing context-specific search results. Section II describes different implementations of the OORCA system. Lastly, Section III describes an electronic system (i.e., a computer system) that implements some embodiments of the invention.

I. OORCA System and Process for Providing Search Results

By way of example, some embodiments of the system perform the process for providing search results. In some embodiments, the system first organizes digital objects into an object-oriented tree and then arranges each node a discrete distance from each other node according to the combination of variables, weights, conditions, and decision algorithms defined by a domain expert for the weight matrix. In some embodiments, the system uses the artificial intelligence engine to compare the menu of different types of searches for a human user to make a selection. The system then provides both the menu of the different types of searches and the selection to the domain expert, who revises the weight matrix based on the selection.

In some embodiments, the different types of searches include a plurality of search types. The plurality of searches can include the most famous Artificial Intelligence searches. In some embodiments, the plurality of search types comprises a Depth-First search, a Breadth-First search, and a British Museum search. The menu of search choices can be presented to the domain expert with explanation facilities and modification capability. Included in the explanation facilities are an audit trail of how the results were calculated.

In some embodiments, rating and ranking of the entire domain can be performed by other experts and lay people interested in the domain area. For instance, information objects and pods can be created containing the domain data, the users, a blog, and an algorithm and calculator for ranking and rating. An administrator of the pod can invite guests, experts, take polls and set permissions to read, write, delete or edit data. This data in the pod is categorized into states and views. A state is the set of members and the views they are allowed to see. A view is the functionality for the data for a particular group of members. In some cases, categorization of complex data can involve techniques from number theory, set theory and artificial intelligence.

In some embodiments, the OORCA system combines multiple technologies and concepts to perform a novel process for organizing disparate information, incorporating human intelligence, enabling AI search methods and producing highly relevant search query results. This approach enables searches to be audited and traced, allowing a user to see how the search results were generated.

By way of example, FIG. 1 conceptually illustrates a high-level architecture of an OORCA system 100 in some embodiments. As shown in this figure, there are several components of the OORCA system 100, including an information object, wise objects, an audit reverse search path, and an artificial intelligence (AI) search engine. The components of the OORCA system 100 allow enhancement of domain specific data with human intelligence. The methodology allows one expert or many to share intelligence, validate results and return more precise results to search inquiries. As shown in FIG. 1, the OORCA system performs a process flow that includes information ingestion from multiple data sources, organization and enrichment of information objects by knowledge experts, and the AI search engine that returns relevant results with reverse search audit information. The first component in OORCAS is the assembly module for ingestion of information and creation of information objects (described in further detail by reference to FIG. 2). Information objects are organized into pods. A pod is comprised of a singleton or a set of related objects. An information object can belong to one or many pods (described in further detail by reference to FIG. 3).

Figure 2:
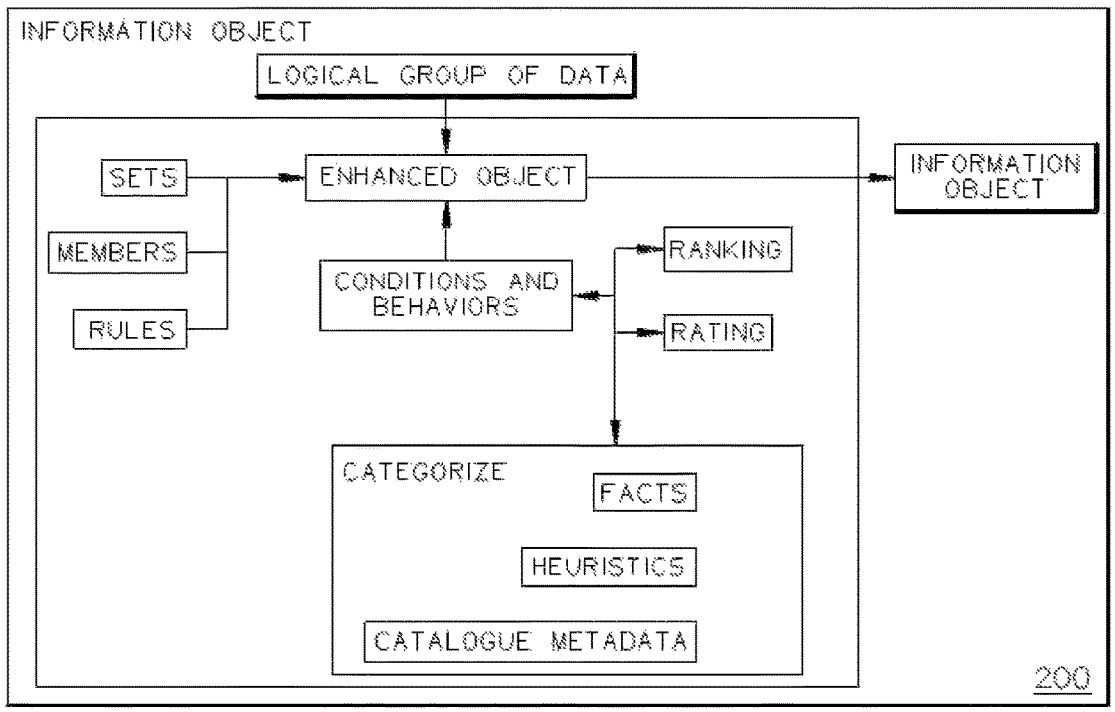
FIG. 2 conceptually illustrates a block diagram data structure of an information object in some embodiments.
Figure 3:
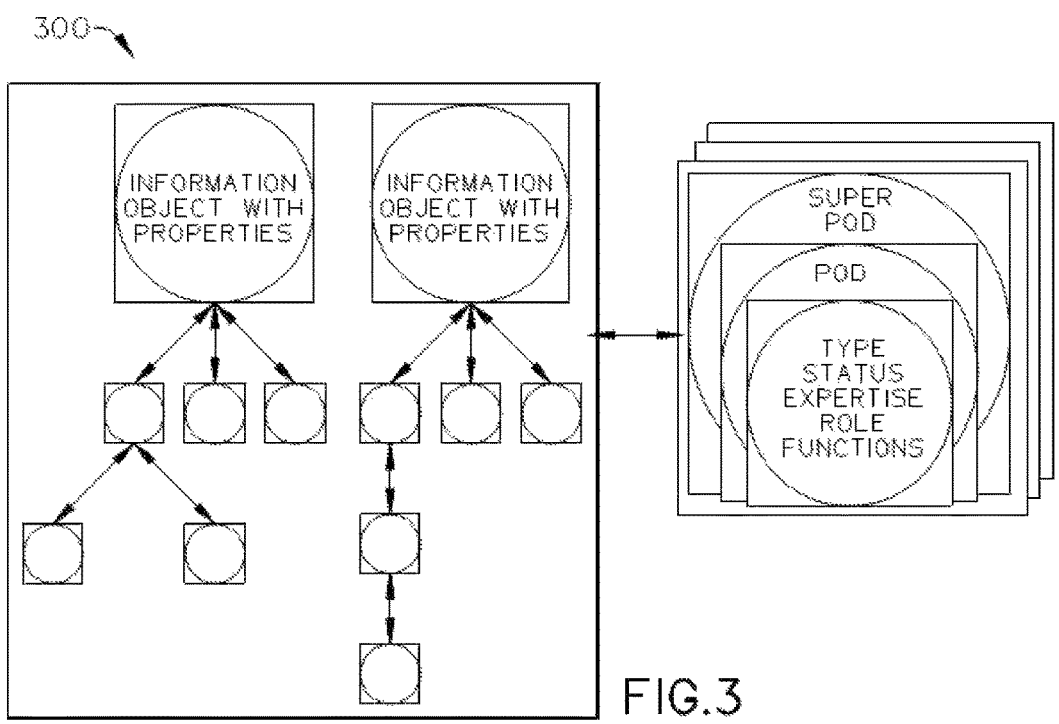
FIG. 3 conceptually illustrates pod organization of a set of information objects in some embodiments.

FIG. 2 conceptually illustrates an information object 200 created in the OORCA system 100. The information object 200 is designed to take full advantage of the capabilities of the AI search engine. The information object 200 includes ranking, rating, and categorization of variables and attributes (e.g., facts, heuristics, catalog meta-data, etc.).

Sets of information objects 200 are organized in the OORCA system 100 by states and views into pods. A state is the set of members and the views they are allowed to see. A view is the functionality for the data for a particular group of members. Logic is used to create states and views. A member can be allowed to access multiple states and multiple views. A state can have multiple views. The administrator of a pod invites guests, experts, takes polls an sets permissions to read, write, delete or edit data. By way of example, FIG. 3 conceptually illustrates pod 300 organization of a set of information objects 200 used in an OORCA system 100 in some embodiments. Pods 300 are organized in terms of states and views for extreme flexibility. This approach is based on number theory, taking advantage of unions and intersections of sets. Any pod can be broken up into sets. Any set can have one or more state(s) and one or more view(s). A pod or super-pod can contain one or many items. An information object 200 can belong to multiple sets, super-sets, subsets and co-sets defined in the pod. Sets follow group theory operations.

The state of a set is used to define functionality, such as social ranking States are defined using reusable object oriented methodology and are flexible enough to be extended to accommodate heterogeneous rules applied to varying pods. Access to states and views is defined by membership and is controlled with a particular view in a state defined by rules based on membership and set definitions. A group could be one person, or several. More states can be created at any time. The view can be defined based on explicit specifications and the required components for accessing the view to support a specific set of information objects. With states and views, a user can decide who can read or write to each information object, and can select the variables the information object includes. Restrictions could be imposed, if at all, at any scope, from entire pods and super pods down to only a single variable in an object. For example, access to a sensitive health result in an information object representing a patient could be restricted entirely, or at each variable of the patient information object that is associated with the identity of the patient.

Figure 4:
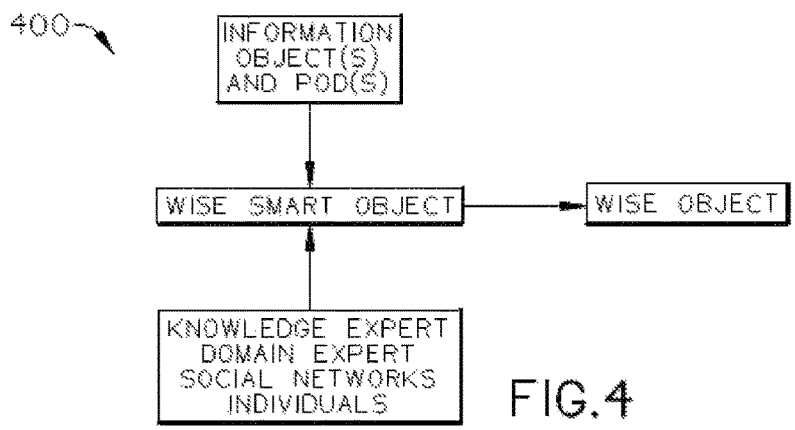
FIG. 4 conceptually illustrates a wise object creation by knowledge expert enrichment of information objects in some embodiments.

After information objects 200 and pods 300 have been created, the OORCA system then creates wise objects. By way of example, FIG. 4 conceptually illustrates a module 300 of wise object creation by knowledge expert enrichment of information objects 200 used in an OORCA system 100 in some embodiments. As shown in this figure, information objects are enriched by knowledge experts to create wise objects. Knowledge experts can be human operators, automated processes, conditional processes, or any combination of these. For instance, knowledge experts can be domain experts, automated or conditional processes accessed through social networks, business or news sites, a professional or a scholar in the domain field, a hobbyist in the domain field, or many others. A knowledge expert will input values for ranking, rating, context, comments, and categorization of the variables in the information object to provide decision criteria for the AI search engine.

Figure 5:
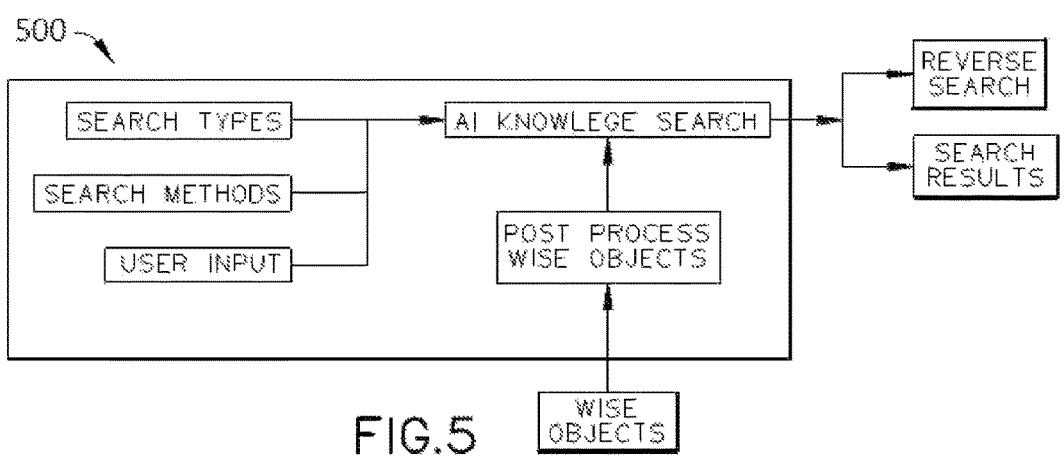
FIG. 5 conceptually illustrates dynamic generation of conditional search trees by an artificial intelligence search engine in some embodiments.

After one or more wise objects are created, the OORCA system uses an artificial intelligence search engine to dynamically generate conditional search trees. By way of example, FIG. 5 conceptually illustrates dynamic generation of conditional search trees by an artificial intelligence (AI) search engine 500 used in the OORCA system 100. The AI search engine 500 post processes wise objects and dynamically generates conditional search trees based on the conditions and domain expertise in the wise objects. As shown in this figure, the AI search engine 500 utilizes predefined search types, methods, and user input to generate AI search results. The inclusion of human knowledge differentiates the AI search engine 500 from typical search engines. The AI search engine 500 uses sets and members to define search domain and control access.

One feature of the AI search engine 500 is its capacity to have prior knowledge and understanding of the objects and the information provided by experts assembled for a specific domain. In some embodiments, the AI search engine 500 architecture is comprised of four major components: (1) channels to search engine with weighted expert-provided data, (2) membership grouping for authentication and authorization, (3) an AI knowledge engine to define rules for weighting based on contributor status, and (4) a data enrichment system that holds the definition of the sets in terms of states, views, and digital objects. After the information is compiled, assembled, and combined, the information can be fed into the AI search engine 500 via the membership grouping system. In some embodiments, the OORCA system processes the data from the channels component and sends it to the data enrichment system. In this way, the OORCA system becomes set up to perform user initiated searches.

When performing a search, the OORCA system of some embodiments applies several different types of search techniques to the digital object trees. Any type of search technique can be applied by the OORCA system. Examples of the types of searches that an OORCA system may apply during a search include (1) AI searches which use heuristics techniques on intelligent data, (2) domain specific searches based on domain expertise contributed to the system, (3) meta-data specific searches based on specific content that can be automatically obtained about an information object including, date, title, author, etc., (4) ranking searches based on domain specific parameters of information objects ranked by domain experts, (5) rating searches based on user input from experts and/or users, (6) contextual searches based on an understanding of the meaning of the search term (e.g., allowing the user to select a search for a bat in context of an understanding that the search is related to a winged mammal bat instead of a baseball bat), (7) restricted searches by allowing only approved users to search for information objects that can be restricted for a variety of reasons (e.g., a trademark search, a copyright search, a search on a culturally sensitive term, donor limitation searches, personal or health information searches, etc.), and (8) pattern matching searches in which a keyword or a phrase search involves running predictive analysis programs to look for trends. Each of these searches can be used individually or in conjunction with one or more of the other search methods.

Figure 6:
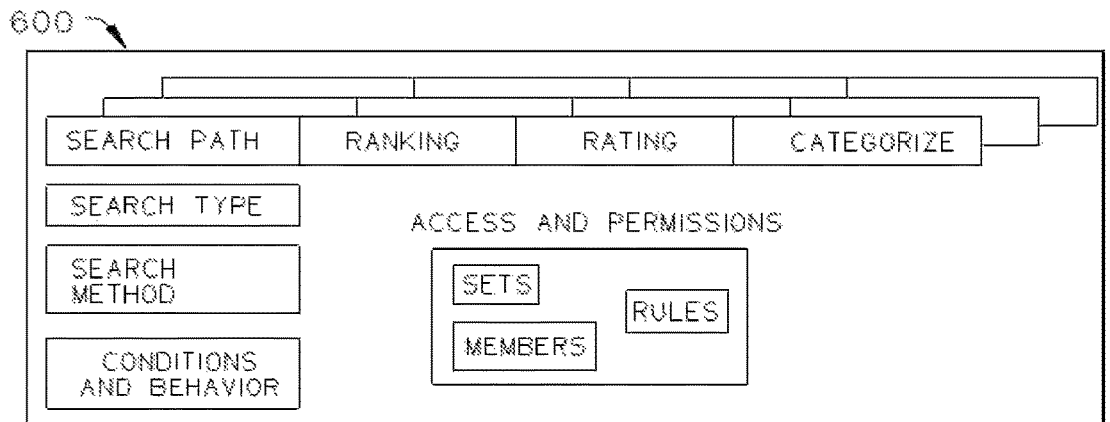
FIG. 6 conceptually illustrates an audit reverse search path generated by an AI search performed by an OORCA system in some embodiments.

As part of the AI search process, an audit reverse search component is generated. By way of example, FIG. 6 conceptually illustrates an audit reverse search component 600 generated by an AI search performed by an OORCA system in some embodiments. As shown in this figure, the audit reverse search component 600 includes a search path, a ranking, a rating, a categorization, a search type, a search method, a set of conditions and behaviors, and a set of access parameters and permissions. The audit reverse search component 600 allows the knowledge experts to understand how AI search results are generated and what conditions, value weightings, and domain expertise were used.

In some embodiments of the OORCA system, conditional logic statements are used to calculate the search query results. The conditional logic statements are dependent on expert ranking, rating, context, and categorization of data. Conditional logic statements and set theory is used to create states and views. A member can be allowed to access multiple states and multiple views. A state can have multiple views.

II. OORCA System Examples

Figure 7:
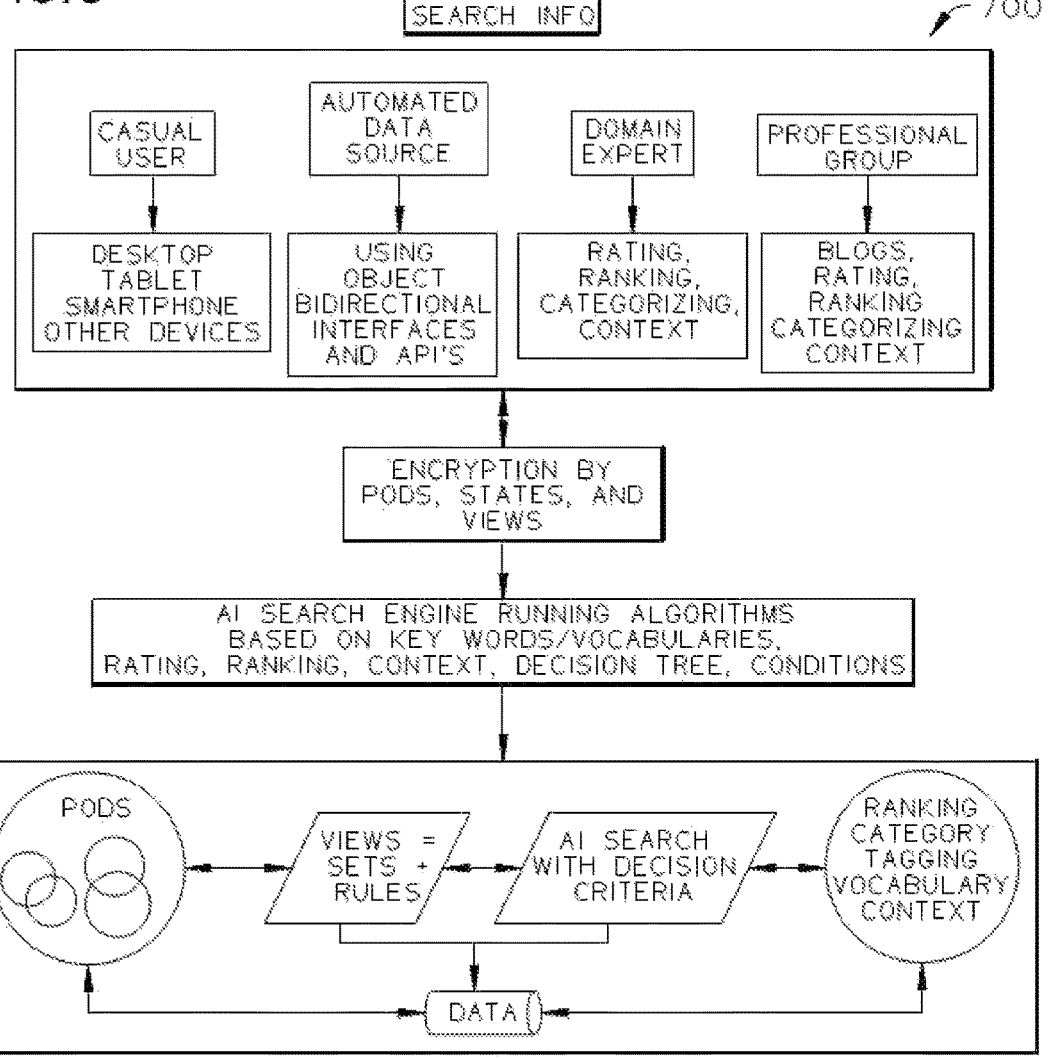
FIG. 7 conceptually illustrates an example OORCA system in some embodiments.

FIG. 7 conceptually illustrates an example OORCA system 700. As shown in this figure, there are four types of contributors, including a casual user, an automated data source, a domain expert, and a professional group. Each type of contributor has a set of permissions and behavior restrictions assigned to the contributor. As shown, the four types of contributors have different levels of privileges. In some embodiments of an OORCA system, different types of contributors may have the same level of privileges. Specifically, for the example shown in FIG. 7, a contributor pre-processes each digital object in terms of its technical, business, process, and collaborative metadata. Technical metadata includes data structures, such as tables, fields, data types, indexes, custom data structures, and so on. Business metadata focuses on various digital object characteristics, including origin, processing, ownership, audit trail, tracking, and rights. Process metadata includes usage data and/or statistical data describing access. Collaborative metadata includes content provided by trial and/or empirical knowledge gathered of by years of experience in a specialized area.

Digital objects are further enhanced to create wise objects. The information that is assigned to a digital object by contributors is weighted based on the individual's status. Status is assigned by the owner of the digital object. The OORCA system of some embodiments builds a nodal decision search tree based on the status distinction and a set of parameters assigned by the contributors. The wise objects become the root of the tree with the nodes being connected by a series of user weighted variables which include ranking, tagging, comments, rating, etc.

The distance between nodes is based on the weighting of the variables. The search routines in the OORCA system attempt to find minimal path lengths based on the user's search requirements and the relationship to the weighting of the parameters of the digital objects. In some embodiments, the object oriented trees are set up before experts evaluate data. The algorithm needs to be modified as new variables and weighting calculations are introduced per data set.

Figure 8:
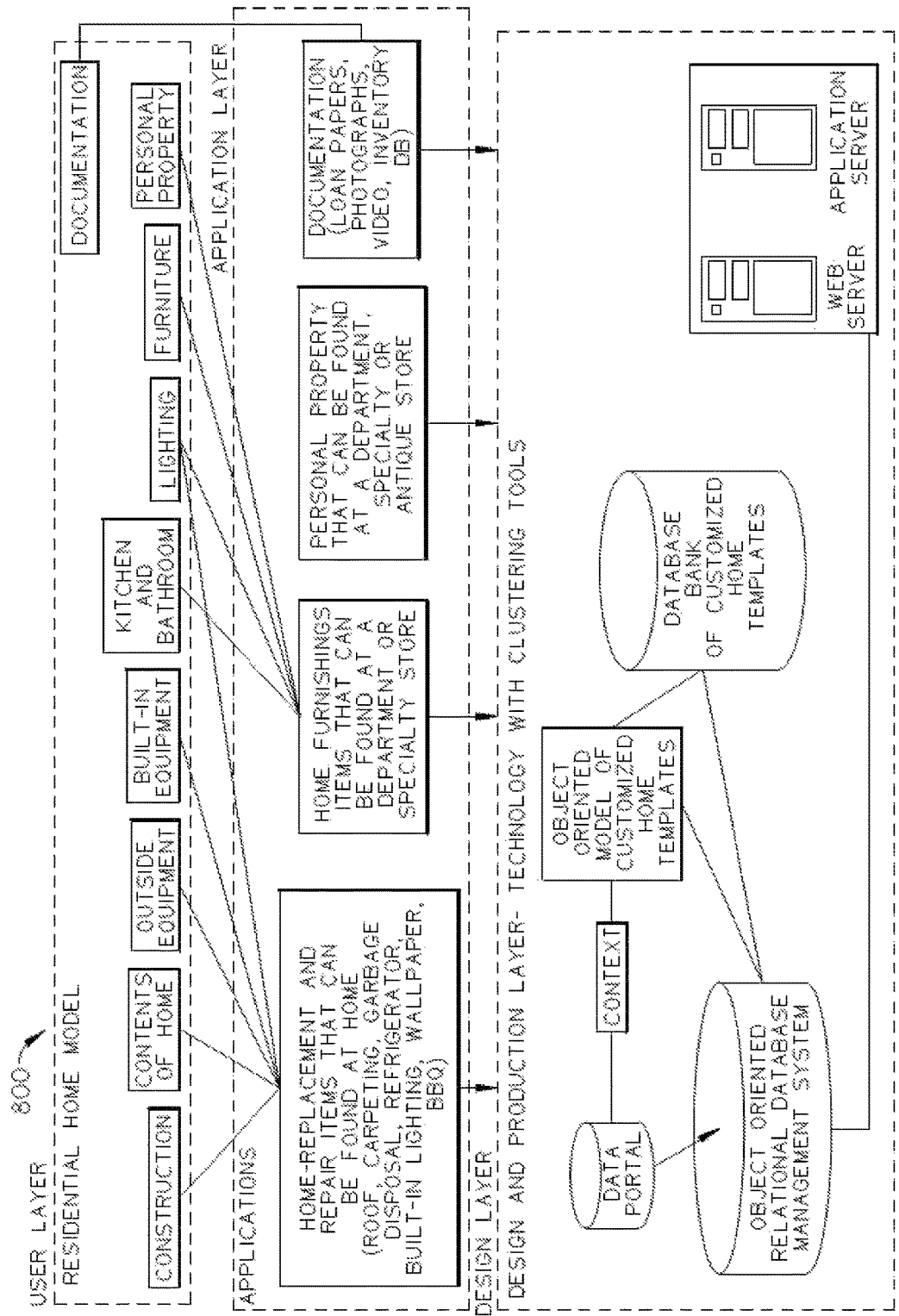
FIG. 8 conceptually illustrates a home inventory OORCA system in some embodiments.

The flexibility of the design of the rating and ranking modules allows results to be weighted differently if conditions or behaviors affecting the search results, such as a recession. A recession would impact the value of items in the house and change the priority of items identified by the search. By way of example; FIG. 8 conceptually illustrates a home inventory example of an OORCA system 800. By using the OORCA system 800 for this home inventory example, the precision of the search will allow home owners to find and recover lost assets after a disaster and prove the current value to replace the assets.

Many other example implementations of OORCA systems are possible. In some cases, the OORCA system is implemented for public usage. Specifically, the AI search engine could be used on the web. For example, the AI search engine is well suited to be used on Social Networking sites such as Facebook, LinkedIn, and Online Gaming sites, to retrieve more precise results. In other cases, the OORCA system is implemented for private usage. For instance, the AI search engine could be used to allow the groups such as the military and/or Executive branch departments to securely share intelligence information. Another application may include mixed public and private usage. For example, categorization and tagging of massive documents inside of a corporation for intelligent retrieval of key information, (e.g., private corporate information to be searched for in relation to cases for a law firm, technical drawings of corporate products for public dissemination or for contractual work for an engineering firm, etc.). The AI search engine is also capable of providing tools for evaluating scholarly papers and other writings to be published, artwork, and musical pieces. The Rating and Ranking system could be used by newspapers or news web sites to evaluate movies by critics and the public. Finally, the system can be used as a fact validator, giving a stamp of approval to public information after authorized experts have fact checked the data. The audit trail and expert would be included in the validation seal.

In some embodiments, the OORCA system includes a server computer which runs one or more software applications. In some embodiments, the process for providing search results is implemented by one or more software applications. In some embodiments, the AI search engine is implemented by one or more software applications. In some embodiments, the OORCA system includes an object-oriented relational database management system comprising a database computing device, a data storage device, and database management software that runs on the database computing device and/or a secure, encrypted cloud server. In some embodiments, the server computer runs database management software to access the database storage device by way of the database management system. In this way, the components of the OORCA system allow enhancement of domain specific data with human intelligence. The methodology of the process performed by the OORCA system allows one expert or many to share intelligence, validate results and return more precise results to search inquiries.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

III. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors), they cause the processing unit(s) to perform the actions indicated in the instructions. Examples of computer readable media include, but are not limited to, CD-ROMs, flash drives, RAM chips, hard drives, EPROMs, EEPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
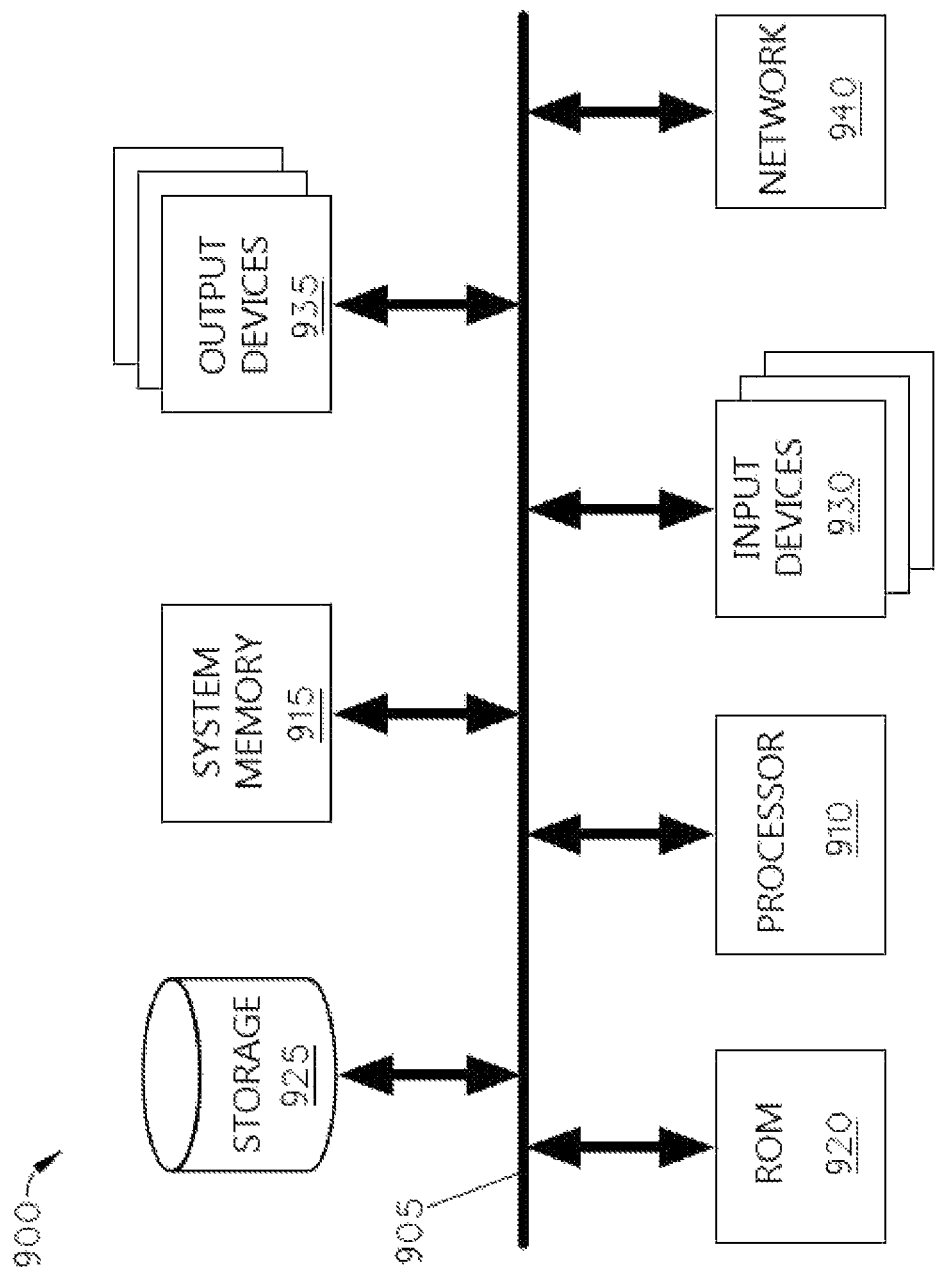
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer, phone, tablet, or any other sort of electronic device. Such an electronic system includes various types of computer readable media and interfaces for various other types of computer readable media. Electronic system 900 includes a bus 905, processing unit(s) 910, a system memory 915, a read-only 920, a permanent storage device 925, input devices 930, output devices 935, and a network 940.

The bus 905 collectively represents all system, peripheral, and chipset buses that communicatively connect the numerous internal devices of the electronic system 900. For instance, the bus 905 communicatively connects the processing unit(s) 910 with the read-only 920, the system memory 915, and the permanent storage device 925.

From these various memory units, the processing unit(s) 910 retrieves instructions to execute and data to process in order to execute the processes of the invention. The processing unit(s) may be a single processor or a multi-core processor in different embodiments.

The read-only-memory (ROM) 920 stores static data and instructions that are needed by the processing unit(s) 910 and other modules of the electronic system. The permanent storage device 925, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 925.

Other embodiments use a removable storage device (such as a floppy disk or a flash drive) as the permanent storage device 925. Like the permanent storage device 925, the system memory 915 is a read-and-write memory device. However, unlike storage device 925, the system memory 915 is a volatile read-and-write memory, such as a random access memory. The system memory 915 stores some of the instructions and data that the processor needs at runtime. In some embodiments, the invention's processes are stored in the system memory 915, the permanent storage device 925, and/or the read-only 920. For example, the various memory units include instructions for processing appearance alterations of displayable characters in accordance with some embodiments. From these various memory units, the processing unit(s) 910 retrieves instructions to execute and data to process in order to execute the processes of some embodiments.

The bus 905 also connects to the input and output devices 930 and 935. The input devices enable the user to communicate information and select commands to the electronic system. The input devices 930 include alphanumeric keyboards and pointing devices (also called "cursor control devices"). The output devices 935 display images generated by the electronic system 900. The output devices 935 include printers and display devices, such as cathode ray tubes (CRT) or liquid crystal displays (LCD). Some embodiments include devices such as a touchscreen that functions as both input and output devices.

Finally, as shown in FIG. 9, bus 905 also couples electronic system 900 to a network 940 through a network adapter (not shown). In this manner, the computer can be a part of a network of computers (such as a local area network ("LAN"), a wide area network ("WAN"), or an Intranet), or a network of networks (such as the Internet). Any or all components of electronic system 900 may be used in conjunction with the invention.

The functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital video discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For example, process flows are conceptually illustrated throughout FIGS. 1-8. The specific operations of these process flows may not be performed in the exact order shown and described. Specific operations may not be performed in one continuous series of operations, and different specific operations may be performed in different embodiments. Furthermore, the process flows could be implemented using several sub-processes, or as part of larger macro processes. Thus, one of ordinary skill in the art would understand that the invention is not to be limited by the foregoing illustrative details and examples, but rather is to be defined by the appended claims.

I claim:

1. A non-transitory computer readable medium storing a program which, when executed by at least one processing unit of a computing device, provides search engine results, said program comprising sets of instructions for:
   ingesting information from a plurality of data sources;
   creating a plurality of information objects based on the ingested information;
   identifying a view for the plurality of information objects, wherein the view comprises a type of functionality of data information related to the plurality of information objects;
   defining a state for the plurality of information objects;
   organizing the plurality of information objects into a pod based on the view and the state for the plurality of information objects;
   enriching the plurality of information objects by a knowledge expert comprising at least one of a human operator, an automated process, and a conditional process, wherein the plurality of information objects are enriched with rankings, ratings, context, comments, and categorization of variables in the information objects to provide decision criteria to an artificial intelligence search engine comprising an AI knowledge engine to define rules for weighting based on contributor status and a data enrichment system that holds definitions of sets in terms of states, views, and digital objects;

creating a plurality of wise objects from the enriched plurality of information objects;

organizing a plurality of nodes representing a plurality of digital wise objects into an object-oriented tree, wherein the plurality of nodes comprises a root node and a plurality of child nodes, wherein each child node is one of connected to the root node directly and connected to the root node indirectly;

arranging each node a discrete distance from each other node with a weight matrix defined by a domain expert, wherein the distance between nodes is based on the weighting of variables as defined in the weight matrix;

comparing a menu of different types of searches for a human user to make a selection of a particular search type, wherein a minimal path length of the distances from the root node to another node in the object-oriented tree is determined when the human user selects the particular search type, wherein the minimal path length is based on the context of the search and the relationship to the variable weightings of the objects; and providing both the menu of the different types of searches and the selection to the domain expert who revises the weight matrix based on the selection of the particular search type.

2. The non-transitory computer readable medium of claim 1, wherein the weight matrix comprises weighted multiple value variables based on variables, weights, conditions, and decision algorithms defined by the domain expert based on the menu of different types of searches and the particular search type.

3. The non-transitory computer readable medium of claim 1, wherein the set of instructions for comparing comprises a set of instructions for applying a set of artificial intelligence logic that is based on the decision criteria provided to the artificial intelligence search engine.

4. The non-transitory computer readable medium of claim 1, wherein the program further comprises a set of instructions for receiving the revised weight matrix from the domain expert.

5. The non-transitory computer readable medium of claim 1, wherein the program further comprises sets of instructions for:

performing a search based on the selection of the particular search type; and providing a set of context-specific search results.

6. The non-transitory computer readable medium of claim 5, wherein the set of instructions for performing the search comprises a set of instructions performing a type of artificial intelligence search.

7. The non-transitory computer readable medium of claim 6, wherein the type of artificial intelligence search comprises one of a depth-first search, a breadth-first search, and a British museum search.

8. The non-transitory computer readable medium of claim 6, wherein the program further comprises a set of instructions for generating an audit reverse search component that provides insight into conditions, value weightings, and domain expertise used in the artificial intelligence search and allows knowledge experts to understand how artificial intelligence search results are generated.

9. The non-transitory computer readable medium of claim 8, wherein the audit reverse search component is generated based on the type of artificial intelligence search performed, wherein the audit reverse search component comprises a search path, a ranking, a rating, a search type, a search method, a set of conditions and behaviors, a set of access parameters and permissions, and a categorization of complex data that involves techniques from number theory, set theory and artificial intelligence.

10. The non-transitory computer readable medium of claim 1, wherein the program further comprises a set of instructions for setting permissions on who can contribute and view information within the context of the search.

* * * * *